June 11, 1957 W. B. RICHARDS ET AL 2,795,464
APPARATUS FOR FLUIDIZING AND CONVEYING GRANULAR MATERIAL
Filed Feb. 16, 1955 2 Sheets-Sheet 2
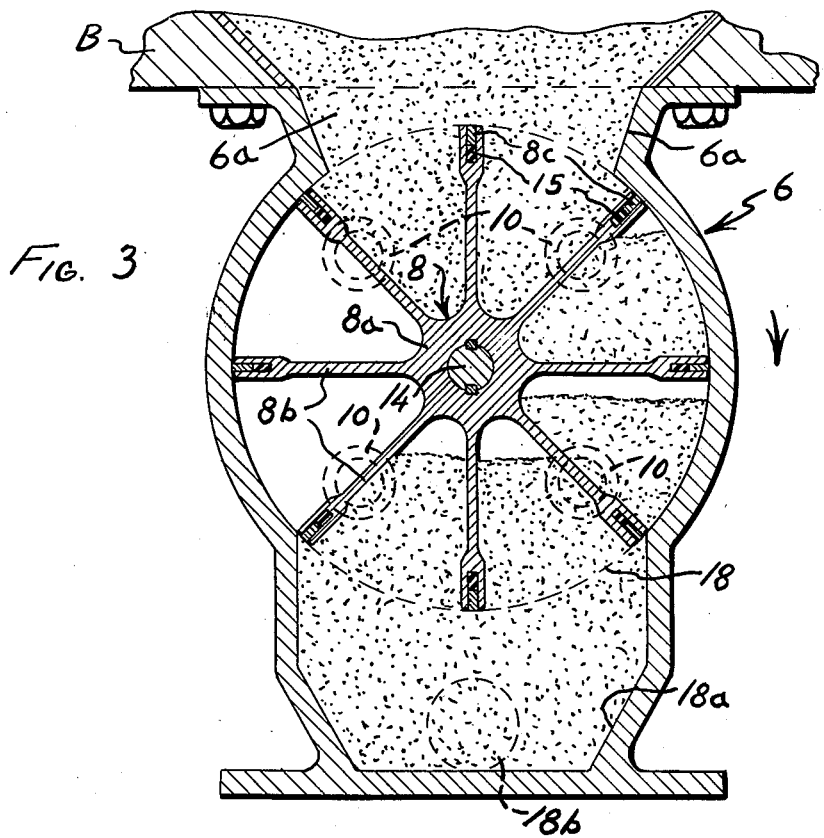
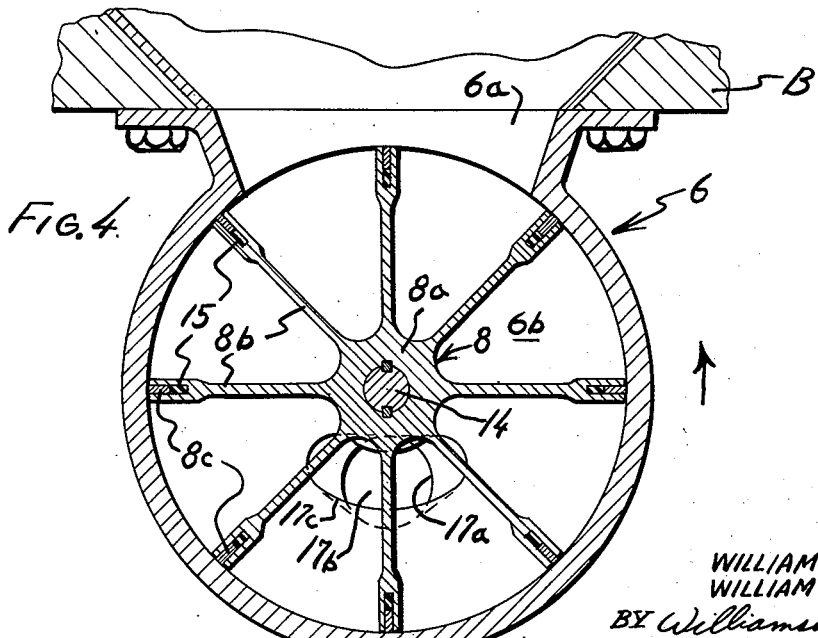
INVENTORS
WILLIAM B. RICHARDS
WILLIAM B. BURNET
BY Williamson, Schroeder,
Adams & Meyer
ATTORNEYS

United States Patent Office 2,795,464
Patented June 11, 1957

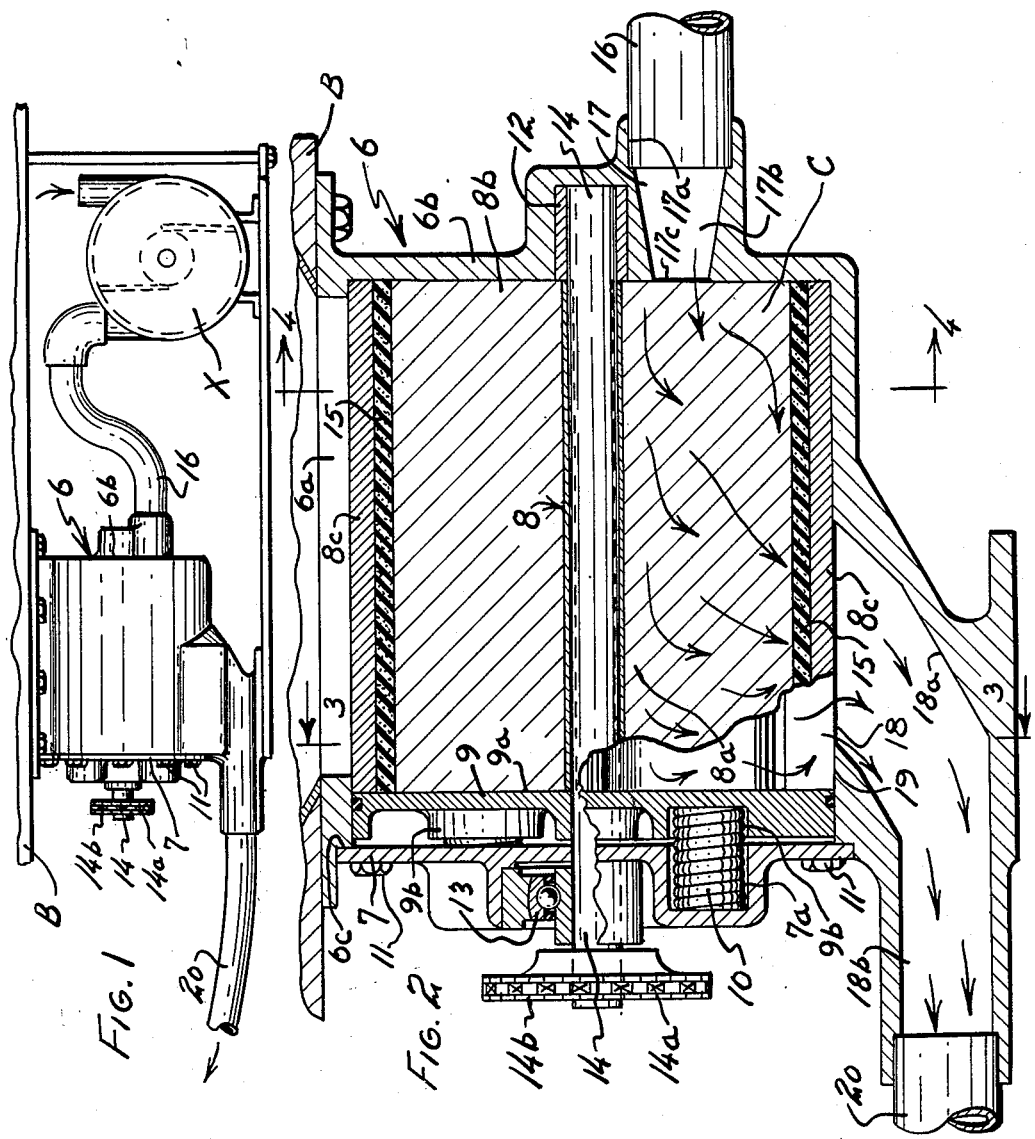

2,795,464

APPARATUS FOR FLUIDIZING AND CONVEYING GRANULAR MATERIAL

William B. Richards and William B. Burnet, Minneapolis, Minn., assignors to Superior Separator Company, Hopkins, Minn., a corporation of Delaware Application February 16, 1955, Serial No. 488,592

5 Claims. (Cl. 302—49)

This invention relates to the fluidizing, discharge and conveying of materials consisting in small particles such as granular and pulverulent materials.

The apparatus of the invention is particularly conceived for quickly and efficiently fluidizing and discharging large quantities of materials such as granulated chemicals, flour, cement, feed stocks and the like.

A number of methods and types of apparatus have heretofore been employed or attempted for conveying granular and pulverulent materials. Most of these employ the principle of pneumatic conveying in contrast to fluidization of the granular or pulverulent material. In pneumatic conveying, ordinarily from one half pound to three pounds of air are utilized for each pound of the material conveyed, the air or other gaseous medium acting as a carrier agent and moving the material incidental to its own travel. Air pressures often less than one pound per square inch are employed, but the air travels at relatively high speed in the range of between 2500 and 5000 feet per minute. The air stream in such a conveying process has the material fed into it in relatively small quantities and "dead spots" are frequent in the system where no material is actually being conveyed with the air. Because of the large volume of air utilized in pneumatic conveying, it is essential that the air be filtered if pureness of the collected product is desired. Because of the foregoing essentials for pneumatic conveying, the cost is relatively high and the density of material conveyed is necessarily very low. The conduits utilized are relatively large and the air speed delivery relatively high. A large amount of power is required and cyclone filters or duct collectors are necessary to separate material from the air, increasing costs and consuming space. In general, the over-all efficiency of pneumatic conveying is low.

In our improved apparatus, fluidized conveying is utilized. The material is thoroughly admixed with the motive air to cause the actual particles of the material to assume the characteristics of molecules in a fluid flow. We have found that if conditions are optimum with our improved apparatus, up to 229 pounds of the material may be conveyed substantial distances, horizontally and in elevation while mixed with only a single pound of air and without application of booster apparatus or devices outside of the original fluidizer for maintaining the fluidized state throughout the path of travel. Air pressures substantially higher than those utilized in pneumatic conveying are necessarily required, ranging from 3 to 60 pounds per square inch, although our preferred range is between 6 and 35 pounds per square inch. The flow of course, in our fluidized conveying system is considerably slower than in pneumatic conveying, ordinarily being less than 1200 feet per minute.

Prior to our invention, there has been some disclosure of apparatus for fluidizing pulverulent materials, usually employing air slides in connection with the fluidizing mechanism. In some few instances, the prior art has enabled pulverulent material to be conveyed in fluidized state to a higher level or through extended horizontal distances without providing additional or booster mechanism along the path of travel. In such prior art, however, the particular construction of the pulverulent-material-feeders forming a part of the fluidizing apparatus substantially lowered the fluidizing efficiency and capacity of the system or apparatus and substantially increased required horse power, size of fluidizing chambers and ability to convey to higher elevations or through long horizontal distances, as well as air pressures needed to achieve and maintain fluidization of the material, and blower size because of leakage and inefficient fluidizing.

It is an object of our present invention to provide a small, compact and self-contained fluidizing unit comprising a minimum number of essential parts, but enabling pulverulent and granular materials such as flour, comminuted chemicals, cement and even materials of larger particle size to be fluidized and conveyed for relatively long distances at very high solids to air ratios.

More specifically, it is an object to provide a substantially improved fluidizing and conveying apparatus utilizing a compact, horizontally disposed fluidizing chamber with a pressure-tight rotary air-lock-feeder mechanism wherein the relationship of intake of the material with the inlet of motive air under pressure and the fusion or intermingling of air and material and discharge of the same, produces a high efficiency with substantially no retravel of the granular material in the continuous revolution of the rotor.

We have discovered that the motive air and the material can be most intimately mixed and blended by creating a very tortuous path for the air and more specifically, a travel of air relative to the lower half of the rotary air-lock-feeder where entrance is made longitudinally of the rotor at the lower half thereof, but thereafter is turned and in part, reversed in its travel through the radial pockets of the feeder, ultimately emerging generally laterally from the lower and forward portion (but not the forward end) of the fluidizing chamber.

Another object is the provision of a highly efficient, low cost fluidizer unit of the class described wherein substantially all material progressively fed into a fluidizing chamber by a rotary air-lock-feeder, is thoroughly fluidized and discharged in fluid state therefrom, leaving no residue in the chamber or air lock rotor when the rotor is stopped.

These and other objects and advantages of our invention will more fully appear from the following description made in connection with the accompanying drawings wherein like reference characters refer to similar parts throughout the several views and in which:

Fig. 1 is a side elevation illustrating an embodiment of our apparatus with some portions of the fluidizing chamber broken away;

Fig. 2 is a longitudinal, vertical section of the air-lock-feeder and fluidizer;

Fig. 3 is a cross section taken on the line 3—3 of Fig. 2, showing how pulverulent material naturally reposes in the several pockets of the rotary air-lock during revolution thereof; and Fig. 4 is a cross section taken on the line 4—4 of Fig. 2 looking in the direction of the arrows.

In the embodiment illustrated, our fluidizing unit is installed in the bottom or sump of a bin B which may be stationary or may be a sheet metal bin on a transportation vehicle. The bin B as shown in Fig. 2 has oppositely inclined sides at the lower portion thereof, causing pulverulent or granular material to by gravity and progressive removal, work toward the bin bottom and to the delivery opening 6a of our fluidizing housing 6.

As shown, we provide a fluidizing housing 6 of horizontal, cylindrical construction and of relatively small diameter, having as shown, an integrally formed, circular, vertical rear wall 6b and defining in its interior, a cylindrical chamber C, open as shown at its forward end and having an annular shoulder or seating flange 6c for receiving in sealed relation, the removable front wall 7 of the housing.

The feed entry passage 6a is elongated and extends longitudinally through the upper side of housing 6 for a distance slightly less than the axial length of a rotary air-lock-feeder 8. An inwardly urged, stationary air lock wall 9 of circular shape is mounted within the forward end of the cylindrical chamber defined by housing 6 having an inner vertical, planar surface 9a which lightly bears against the blade ends of the rotor. The housing 6, front wall 7 and air lock wall 9 may all be conveniently constructed from castings although die casting or even stamping may be utilized if desired. The air lock wall 9 has a plurality (as shown, four triangularly arranged) bossed sockets 9b for seating the inner ends of coil pressure springs 10 urging said wall inwardly against the front edges of the rotor blades. The forward wall 7 of the housing has a similar number of bossed recesses 7a for abutment and receiving of the outer ends of the springs 10. Rear wall 7 is secured in the annular seat 6c by suitable means such as circumferentially spaced bolts 11. Suitable bearings 12 and 13 are axially mounted in the rear end 6b of the housing and in the forward wall 7 respectively, in which the rotor shaft 14 is journaled.

The rotor 8 has a hub 8a which is keyed to shaft 14 and carries a plurality of outwardly extending, radial blades 8b which equally divide the fluidizing chamber into a plurality of segmental pockets. Blades 8b, as shown, are slightly thickened at their outer portions and are radially slotted to slidably accommodate longitudinal blade tips 8c which are thrust outwardly by resilient means such as elastic, sponge rubber pads 15, said pads extending the full length of the blades and being interposed as shown in Figs. 3 and 4 at the inner ends of the blade seats.

It is important that an efficient sealing relation be provided between the tips of the blades and the cylindrical fluidizing chamber C with provision for take-up for wear. We have found that making the blade tips 8c of bronze or of the same material as the rotor will equalize wear and produce long use of the unit before replacement of blade tips becomes necessary.

As shown, the material feed entrance passage 6a is of somewhat less width than the arcuate width of two of said segmental pockets P although this may be varied within substantial range. The entrance preferably at its longitudinal edges converges to facilitate successive loading of the pockets in the rotation of feeder rotor 8.

Any suitable power means for driving rotor 8 may be employed, as shown, shaft 14 being provided with a sprocket 14a over which a roller chain 14b is trained, driven from a motor or the like. If various types of granulated and pulverulent materials are used in the same apparatus, it is desirable to include a variable speed drive.

To provide a source of fluidizing gas such as air, an efficient compressor or blower X of conventional type may be utilized, having its discharge connected by a conduit 16 with the gas inlet passage 17 of the fluidizing housing.

Gas inlet 17 includes a flanged cylindrical socket 17a for receiving in sealed relation a conduit 16 and then as shown in Figs. 2 and 3, tapers and changes shape to a discharge nozzle portion 17b which terminates in a kidney shaped orifice 17c having a center-line arc substantially concentric with the axis of rotor 8. As shown, orifice 17c has a maximum length exceeding the opposed portions of two of the segmental pockets P of the rotor. The axis of the inlet conduit 16 and all portions of the inlet passage 17 are disposed eccentric to and preferably below the axis of the rotor shaft with the orifice 17c being disposed at its upper edge slightly below the apex portion of the adjacent pockets.

A gaseous medium is thus initially introduced longitudinally of the rotor 8 from the rear end thereof and at the apex portions of the segmental pockets which successively become aligned with the orifice 17c. We have discovered that substantially straight travel of the fluidizing medium longitudinally through an air-lock-feeder discharged from the opposite end from entrance only accomplishes a very low efficiency of fluidization of the pulverulent or granular material. Such longitudinal or straight line flow produces travel of the air either through voids at the apex portions of the material-containing-pockets or causes the air under pressure to tunnel through the material in the pockets still leaving a substantial proportion of the material in each pocket where it carries around as the rotor turns. Efficient fluidization may only be obtained with rotary air lock type feeders by very intimately mixing and blending air and pulverulent or granular material by creating a very tortuous path for the air. We have found that by changing the initial direction of the air simultaneously in several directions a very excellent efficiency may be attained. The combinative relationship of entrance of the gaseous medium under pressure, its relation to the segmental pockets defined by the rotor blades and the interrelation of the foregoing parts with the discharge, is all important in the success of the unit.

As shown, we provide a discharge passage 18 extending generally laterally from the lower portion of chamber C having a relatively wide, substantially oblong shaped communication with the lower portion of fluidizing chamber C terminating short of the forward end of the rotor 8 and leaving a forward air-turning ledge 19 at the bottom of fluidizing chamber C and extending rearwardly to or preferably slightly past the midway point of the length or rotor 8. The discharge passage 18 tapers from said rectangular area of communication outwardly and as shown, is defined at the bottom by a wall or surface 18a inclined acutely to the forward portion of the rotor orbit and narrowing down in the form disclosed, to a tubular discharge extremity 18b which as shown, is connected with sealing effect to a pipe or hose 20. The direction of the discharge port is completely unimportant as the motive air and fluidizing material in leaving the apexes of the pockets, is moving directly outward and substantially radially and downward in the form illustrated.

OPERATION

From the foregoing description and by reference to the drawings, it will be seen that we introduce the fluidizing gas (ordinarily air or some inert gas) under pressure axially at the rear end of the rotary, air-lock-feeder and fluidizing chamber and preferably, as close to the very apexes of the material-conveying pockets of rotor 8 as possible. The entering fluidizing air or gas successively enters the apex portion of the several pockets P, completely filling any voids in said pockets and initially being directed longitudinally through the pockets fairly close to the axis of the rotor. Since the forward end of rotor 8 is closed in substantially sealed relation by the inwardly urged, stationary air-lock wall 9, fluidizing gas is turned outwardly and downwardly as indicated by the arrows in Fig. 2 throughout the length of the respective pockets, thereafter flowing outwardly, radially of the pockets and intimately admixing with the pulverulent or granular material therein to force the material outwardly and downwardly as shown in the embodiment illustrated towards the rectangular communication opening of the discharge passage 18.

A substantial portion of the fluidizing air is turned by vertical interposition of the substantially sealed air-lock wall 9 through 180 degrees, as indicated by the arrows at the left end of the fluidizing chamber in Fig. 2. The ledge 19, at the forward end of the communication opening has an important cooperative function in turning the air and causing a thorough intermingling of air and material at the forward end and adjacent portion of the fluidizing chamber. This same ledge 19 and its relation to the laterally extending discharge passage 18 again causes turning of the air outwardly and downwardly, as shown in the embodiment illustrated, whereafter a further tortuous path is set up in the air and fluidized material, through the tapering of the discharge passage 18 and regardless of the direction of the discharge extremity of the passage 18.

Such tortuous travel of the fluidizing gas and pulverulent or granular material, with its initial filling of all voids in the respective and successively presented pockets, positively prevents passage of air longitudinally through the rotor in voids disposed above or in any portions longitudinally of the pockets and prevents tunneling of the fluidizing medium through material in the pockets, both of which objectionable features are prevalent in prior art devices to the end that a relatively large amount of the granular material within pockets remains therein during revolution of the air-lock-feeder and turns with the rotor through many successive cycles.

With our structure, the pockets are constantly emptied of all conveyed material and the air in its tortuous, multi-turned travel through the pockets and opening portions of the discharge passage, is very intimately admixed with the individual particles of granular material producing a very high efficiency of fluidization heretofore, to our knowledge, not attained in any prior art machine or apparatus. When the rotary feeder 8 is stopped and discharge of fluidizing gas shut off thereafter, the pockets of the rotor, the entire fluidizing chamber and the discharge passage 18 are clean and substantially completely free of any remaining deposits of the granular or pulverulent material. Slugging of material or pulsation or spurting of discharge will not occur in our improved structure because of the closely cooperating relationship of the entrance direction of fluidizing gas with the apex portions of the pockets and the relationship of the forward, closed end of the rotor in combinative relation to the generally laterally disposed, tapering discharge passage. The interposition of the air-turning-ledge 19 is also an important factor, although reasonable successful results can be obtained without utilization of this ledge.

Due to the above recited, novel combinative structure and inherent functions and operation thereof, high capacity and highly efficient fluidization may be obtained, using compact fluidizing chambers and rotary, air-lock-feeders of relatively small diameter as contrasted to the prior art. Furthermore, relatively low rotor speeds and fluidizing gas pressures may be employed to obtain nevertheless, a relatively high capacity delivery of fluidized granular or pulverulent material.

Because of the efficiency of our device, such materials as coarse cereal middlings, poultry and stock feed containing grits, chopped alfalfa and even whole grain and materials employing a tremendously wide variance of particle sizes and shapes, have been successfully fluidized and conveyed in fluidized state for substantial distances through hose or pipe communications from the discharge passage 18.

The optimum air-lock rotor speed is a function of the following variables:

(a) The type of material and its characteristics;
(b) The amount of air leakage upwardly through the air lock. This is extremely small in our improved structure because the longitudinal blade tips 8c of the rotor are in substantially sealing contact with the cylindrical fluidizing-chamber-wall; and since further, the ends of the rotor are in substantially sealing engagement with the rear end 6b and the air-lock wall 9 at the forward end of the fluidizing chamber;
(c) The length of the discharge hose or pipe used;
(d) The cross sectional bore of the pipe or hose;
(e) The co-efficient of friction of the hose or pipe wall; and
(f) The dimensions of the air-lock used.

We have found that while with our improved structure, optimum rotor speed can be readily determined for any pulverulent or granular material to be fluidized and conveyed, a variation of even as little as from one to three R. P. M., from the optimum R. P. M. of the rotor-feeder, makes considerable difference in both the flow rate and the solids-to-air ratio.

On pulverulent material such as family flour and finely pulverized chemical materials, we have exceeded in numerous instances, a solids-to-air ratio of 215 pounds of solids in 1 pound of air. In fluidizing coarser material and materials having greater variance in particle size, we have in many cases, obtained solids-to-air ratios of better than 125 to 1.

Below are enumerated a few examples of fluidizer performance wherein a fluidizing chamber, air entrance and discharge passages and rotary, air-lock-feeder are utilized, constructed in accordance with the embodiment illustrated herein, and with the rotor having only a diameter of 7½ inches, and where a sandblast discharge hose was employed, extending through approximately 25 feet and having an internal diameter of 1³⁄₁₆ inches.

*Example 1*

Material_____ Family flour.
Air flow_____ 5 C. F. M. (free air).
Air pressure_____ 4½ p. s. i.
Material flow rate_____ 82 lbs. per minute.
Air-lock-feeder speed_____ 29 R. P. M.

Under the foregoing conditions, our improved fluidizer apparatus produced a solids-to-air ratio of 229 pounds of the flour to 1 pound of air. The conveying velocity was 915 feet per minute.

*Example 2*

The material in this example consisted in a poultry feed comprising a dry mixture of ground, yellow corn, standard wheat middlings, soy bean oil meal, alfalfa meal, dried whey, meat and bone scraps, fish meal with very small proportional amounts of ground limestone, defluorinated phosphate, salt, vitamins and a trace of manganese sulfate.

Air flow_____ 6¾ C. F. M. (free air).
Air pressure_____ 7 p. s. i.
Material flow rates_____ 63.2 lbs. per minute.
Air-lock-feeder speed_____ 23 R. P. M.

In this experiment, our improved apparatus produced a solids-to-air ratio of 100 pounds of the feed material to 1 pound of air.

*Example 3*

Material_____ Bagged Portland cement.
Air flow_____ 14½ C. F. M.
Air pressure_____ 5½ p. s. i.
Material flow rate_____ 108 lbs. per minute.
Air-lock speed_____ 20 R. P. M.

In this example, our improved apparatus produced a solids-to-air ratio of 92 pounds of Portland cement to 1 pound of air.

From the foregoing description, it will be seen that we have provided a very compact, self-contained, fluidizing unit and apparatus comprising a minimum number of essential parts but nevertheless, efficiently operating to fluidize and convey various granular and pulverulent materials for considerable distances at a very high, solid-to-air ratio.

It further will be seen that with our structure, a highly efficient fusion or intermingling of air or material is accomplished with substantially no leakage of pressure or air in the rotary, air-lock-feeder.

It will of course be understood that various changes may be made in the form, detail, arrangement and proportion of the parts without departing from the scope of our invention.

What is claimed is:

1. Apparatus for fluidizing and conveying particle-comprising material, having in combination a housing defining a substantially cylindrical fluid chamber with end walls extending transversely to the axis thereof, said housing having a laterally extending, longitudinal, material-receiving entrance and having a relatively small, gas-entrance passage in an end portion thereof for connection with a source of fluidizing gas under pressure, a rotary, air-lock-feeder mounted substantially coaxially within said chamber and having a series of substantially radially extending, longitudinal blades defining a plurality of material-receiving pockets, a fluidized-material-discharge passage communicating with the end portion of said chamber opposite to the gas-entrance end portion thereof, said blades at their longitudinal tip portions being resiliently urged into sealing engagement with the periphery of said chamber and means associated with the end walls of said chamber for engaging in sealed relation the rotor-end extremities of said blades.

2. The structure set forth in claim 1 wherein said blades have longitudinally extending tip elements slidably related to the main portions of said blades and wherein resilient elements are interposed between said tip elements and adjacent portions of said blades for urging said tip elements radially outwardly.

3. Apparatus for effecting conveyance of particle-comprising material, having in combination a housing defining a substantially cylindrical fluid chamber with end walls extending transversely to the axis thereof, said housing having a laterally extending, longitudinal, material-receiving entrance and having a relatively small, gas-entrance passage in an end portion thereof for connection with a source of gas under pressure, a rotary air-lock-feeder mounted substantially coaxially within said chamber and having a series of substantially radially extending, longitudinal blades defining a plurality of material-receiving pockets, a gassed-material-discharge passage communicating with said chamber adjacent the end opposite to said gas entrance portion and one of the end walls of said chamber being mounted in substantially sealed relation to the periphery of said chamber with provision for relative sliding movement thereof in a direction axially of said chamber and resilient means for urging said last mentioned wall inwardly against the adjacent ends of said blades.

4. Apparatus for intimately, gas-admixing, dispersing and conveying particle-comprising material having in combination a substantially cylindrical housing provided with end walls and having an elongated, longitudinally disposed material-receiving entrance, an open-ended air-lock-rotor mounted substantially coaxially within said housing and having a series of substantially radially extending blades which define segmental-shaped, material-receiving pockets, the edges of said blades having approximately sealed relationship with the inner peripheral wall of said housing, one of the end walls of said housing having an entrance passage therethrough for gas under pressure, said passage being disposed eccentrically of said rotor and longitudinally thereof and directed toward one of the open ends of said rotor to discharge gas under pressure longitudinally and successively into the ends of said segmental pockets during rotor revolution, said housing having a gassed-material discharge passage through a peripheral portion thereof, spaced away from said material-receiving entrance and in communication with an area of the interior of said housing at least equal to the area of the gas-entrance communication, said gassed-material discharge passage converging outwardly and having an outlet for connection with a conveying conduit, the communication of said last mentioned discharge passage, peripherally with the interior of said housing being spaced a short distance inwardly from the end of said housing opposite from the gas entrance end to form a ledge protruding inwardly from said opposite end, whereby with the cooperation of said gas-entrance passage, said discharge and said housing, longitudinally entering gas will be deflected, diffused in various curved paths and in tortuous paths at said opposite end of the housing, discharging all the material throughout the length of said pockets.

5. Apparatus for intimately, gas-admixing, dispersing and conveying particle-comprising material having in combination a substantially cylindrical housing provided with end walls and having an elongated, longitudinally disposed material-receiving entrance, an open-ended air-lock-rotor mounted substantially coaxially within said housing and having a series of substantially radially extending blades which define segmental-shaped, material-receiving pockets, the edges of said blades having approximately sealed relationship with the inner peripheral wall of said housing, one of the end walls of said housing having an entrance passage therethrough for gas under pressure, said passage being disposed eccentrically of said rotor and longitudinally thereof and directed toward the open ends of said material-receiving pockets to discharge gas under pressure longitudinally and successively into said ends during revolution of said rotor, said housing having a gassed-material discharge passage through a peripheral portion thereof spaced away from said material-receiving entrance and in communication with an area of the interior of said housing somewhat greater than the area of said gas entrance communication, said last mentioned passage diverging from the periphery of said rotor obliquely to the direction of air intake and having an outlet for connection with a conveying conduit and the communication of said last mentioned discharge passage peripherally with the interior of said housing being spaced a short distance inwardly from the end of said housing opposite from the gas entrance end to form a ledge protruding inwardly from said opposite end.

References Cited in the file of this patent

UNITED STATES PATENTS

| | | |
|---|---|---|
| 1,935,977 | Geer | Nov. 21, 1933 |
| 1,943,589 | Domina | Jan. 16, 1934 |
| 1,999,430 | Townsend | Apr. 30, 1935 |
| 2,293,871 | Whitfield | Aug. 25, 1942 |
| 2,585,472 | Kennedy | Feb. 12, 1952 |
| 2,712,475 | Lukes | July 5, 1955 |
| 2,712,963 | Edwards | July 12, 1955 |